United States Patent [19]

Saraki

[11] Patent Number: 5,640,581
[45] Date of Patent: Jun. 17, 1997

[54] CD-ROM INFORMATION EDITING APPARATUS

[75] Inventor: Masashi Saraki, c/o Adachi International Nagoyaseni Bldg. 9-27 Nishiki 2-chome, Naka-ku, Nagoya-shi, Aichi-ken, Japan

[73] Assignee: Masashi Saraki, Nagoya, Japan

[21] Appl. No.: 289,505

[22] Filed: Aug. 12, 1994

[51] Int. Cl.$^6$ .................................................. G06F 17/24
[52] U.S. Cl. ........................... 395/792; 395/799; 395/802
[58] Field of Search .................... 364/419.17, 419.18, 364/419.19, 419.1; 395/600, 650, 792, 793, 799, 802, 65

[56] References Cited

U.S. PATENT DOCUMENTS

| | | | |
|---|---|---|---|
| 4,876,665 | 10/1989 | Iwai et al. | 364/920.6 |
| 5,257,186 | 10/1993 | Ukita et al. | 364/419.1 |
| 5,258,910 | 11/1993 | Kanza et al. | 364/419.1 |
| 5,351,189 | 9/1994 | Doi et al. | 364/419.02 |
| 5,369,573 | 11/1994 | Holloran et al. | 364/419.07 |
| 5,369,574 | 11/1994 | Masegi et al. | 364/419.08 |
| 5,475,588 | 12/1995 | Schabeo et al. | 364/419.08 |

OTHER PUBLICATIONS

"Mastering Word Perfect 5.1 & 5.2 for Windows™", Alan Simpson, 1993 USA pp. 410 and 472.

*Primary Examiner*—Gail O. Hayes
*Assistant Examiner*—Frantzy Poinvil

[57] ABSTRACT

A CD-ROM information editing apparatus is proposed which edits information recorded on CD-ROM and input from an external CD-ROM information reading equipment. A plurality of text files included in the input information is first linked into a single file. Unnecessary information among the data of the linked file is then eliminated. Moreover, compound sentences and complex sentences are divided into simple sentences. The CD-ROM information is thus edited and thereby provides facilitated and expedited process at later translation by an automatic translation equipment.

6 Claims, 6 Drawing Sheets

CD-ROM INFORMATION EDITING APPARATUS

FIELD OF THE INVENTION

This invention relates to a CD-ROM information editing apparatus for editing text file input from external CD-ROM information reading equipment.

BACKGROUND OF THE INVENTION

CD-ROMs containing patent information and technical information are nowadays available in every country in each language. For example, in 1993 the Japanese Patent Office begins publication of patent application bulletin in the form of CD-ROM. CD-ROM laid open gazette search system has spread rapidly with publication of these CD-ROMs. Such a kind of search system retrieves a desirable gazette from the patent application bulletin recorded on the CD-ROM. The retrieved gazette can be displayed, printed out, and output as a text file. The text file can be used, for example, as original text on which translation using an automatic translation equipment is performed.

Incidentally, such patent application bulletin recorded on the CD-ROM published by the Japanese Patent Office contains a variety of control information in addition to text information and image information. Among such control information are various codes which cannot be converted into text information and are automatically converted into "=". Tags indicative of the location to insert image data or user-registered characters, tags indicative of a layout and other tags indicative of the logic structure are unnecessary garbage data when only text information is needed.

For example, when a front page file of the gazette recorded on the CD-ROM is output, image data on the file becomes, when deleted, a blank page with irrelevant marks such as an indication mark [frame 1] or continuance mark "===". Moreover, a blank page on the original file may contain a plurality of codes indicative of a new line, and the end of a sentence in each text may have a plurality of spaces. It is thus difficult to output the original file in a well-refined style.

Because of the irregularity of the style, the search system requires revision of the output text files one by one, thereby increasing labor cost and inconveniences. Moreover, in the above search system one file is output for each single gazette. A number of text files are output for a number of front pages. The search system needs repeated manual labor to link these text files, accordingly.

In addition, patent specifications have fluctuation of expression, alienation from correct grammar and long sentences too often to be correctly translated into other language. These are serious problems for machine translation. Therefore, the pre-editing of machine translation requires labor to convert the words and sentences into ones which conforms to the machine translation process. Alternatively, parenthesis "( )" or other marks would be inserted into the original text or another procedure would be taken to point out problematic places in the document. Regardless of which method is chosen, however, the patent specifications have required tremendous labor cost and time before translation. A solution for performing a speedy and facilitated translation on a large quantity of patent gazettes has been long awaited.

SUMMARY OF THE INVENTION

Figure 1:
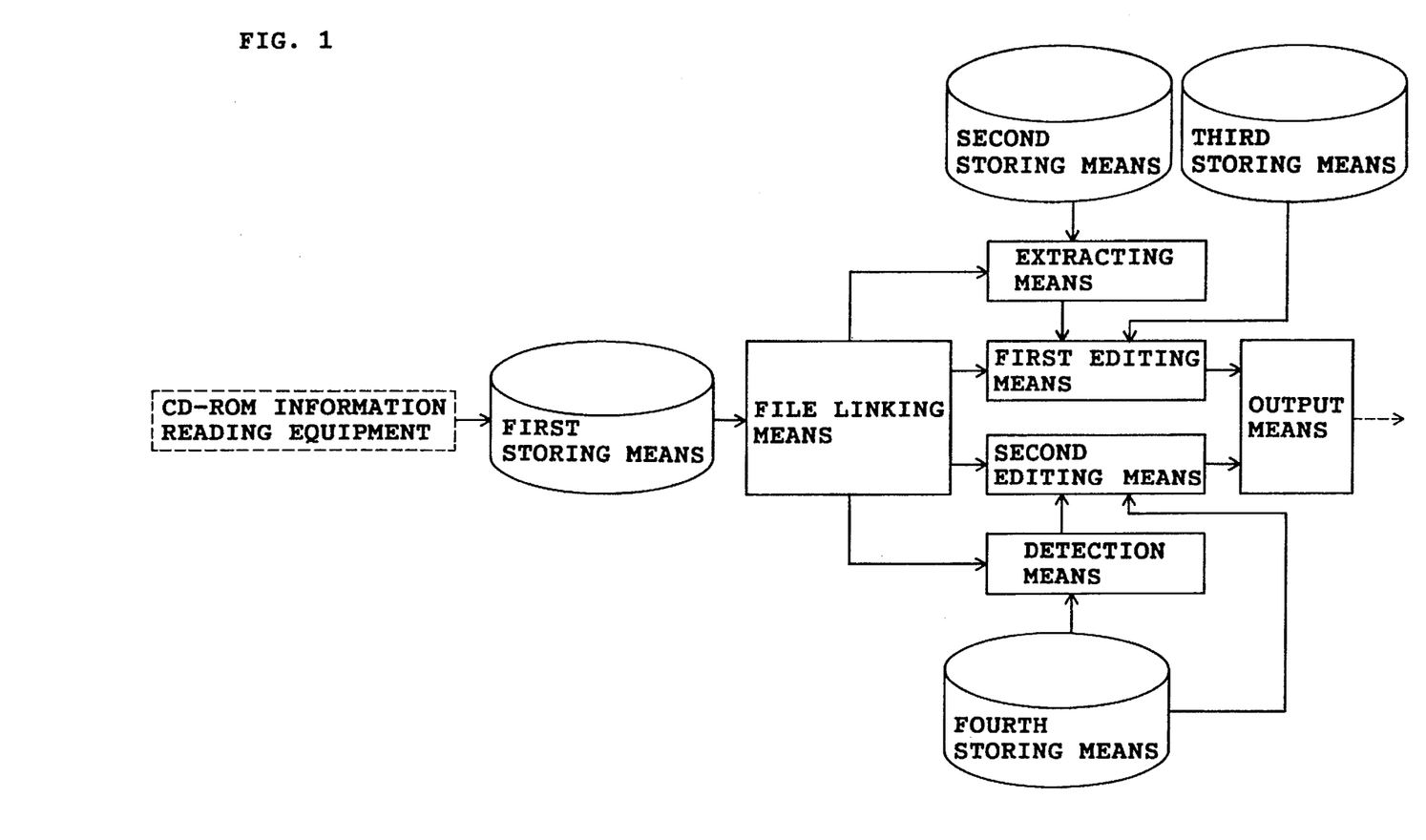
FIG. 1 is a block diagram schematically showing the structure of the present CD-ROM information editing apparatus.

Wherefore, the object of the invention is to solve the above problem by providing a CD-ROM information editing apparatus for automatically editing a plurality of text files. In order to attain the object, the CD-ROM information editing apparatus of the invention edits information input from an external information reading equipment which reads out information from CD-ROM storage medium. As shown in FIG. 1, the CD-ROM information editing apparatus includes first storing means for storing a plurality of text files input from the external CD-ROM information reading equipment; second storing means for storing word data concerning delimiters in the original language; third storing means for storing sentence revision rule; fourth storing means for storing reference format rule in the language in which the text is written; file linking means for linking the plurality of text files stored in the first storing means into a single text file; extracting means for extracting predetermined delimiters from the single text file according to the word data stored in the second storing means; first editing means for editing the single text file by eliminating unnecessary information other than text information from the single text file and by segmenting sentence data at the delimiters extracted by the extracting means, according to the sentence revision rule stored in the third storing means; detection means for detecting an alienation of the word data included within the single text file from the reference format stored in the fourth storing means; second editing means for editing the single text file by correcting the alienation of the word data detected by the detection means according to the reference format rule stored in the fourth storing means; and output means for outputting the single text file edited by the first and second editing means to the external.

In operation, when the first storing means saves a plurality of text files, the file linking means links them into a single text file. Then, the extracting means extracts predetermined delimiters from the single text file according to the word data stored in the second storing means. Subsequently, the first editing means eliminates unnecessary information other than text information from the single text file, according to the sentence revision rule stored in the third storing means. In addition, the first editing means segments sentence data at delimiters. When the detection means detects an alienation of the word data included within the single text file, from the reference format rule stored in the fourth storing means, the second editing means corrects the detected alienation of the word data according to the reference format rule.

Thus, a plurality of text files are linked to a single text file. Unnecessary information included in the single text file is eliminated. Further, a sentence data having any predetermined delimiter is segmented at the delimiters. Consequently, the alienation of the word data from the reference format rule is corrected.

Other objects, advantages and novel features of the present invention will be apparent from the following detailed description of the invention when considered in conjunction with the accompanying drawings.

DETAILED DESCRIPTION OF THE PREFERRED EMBODIMENT

Figure 2:
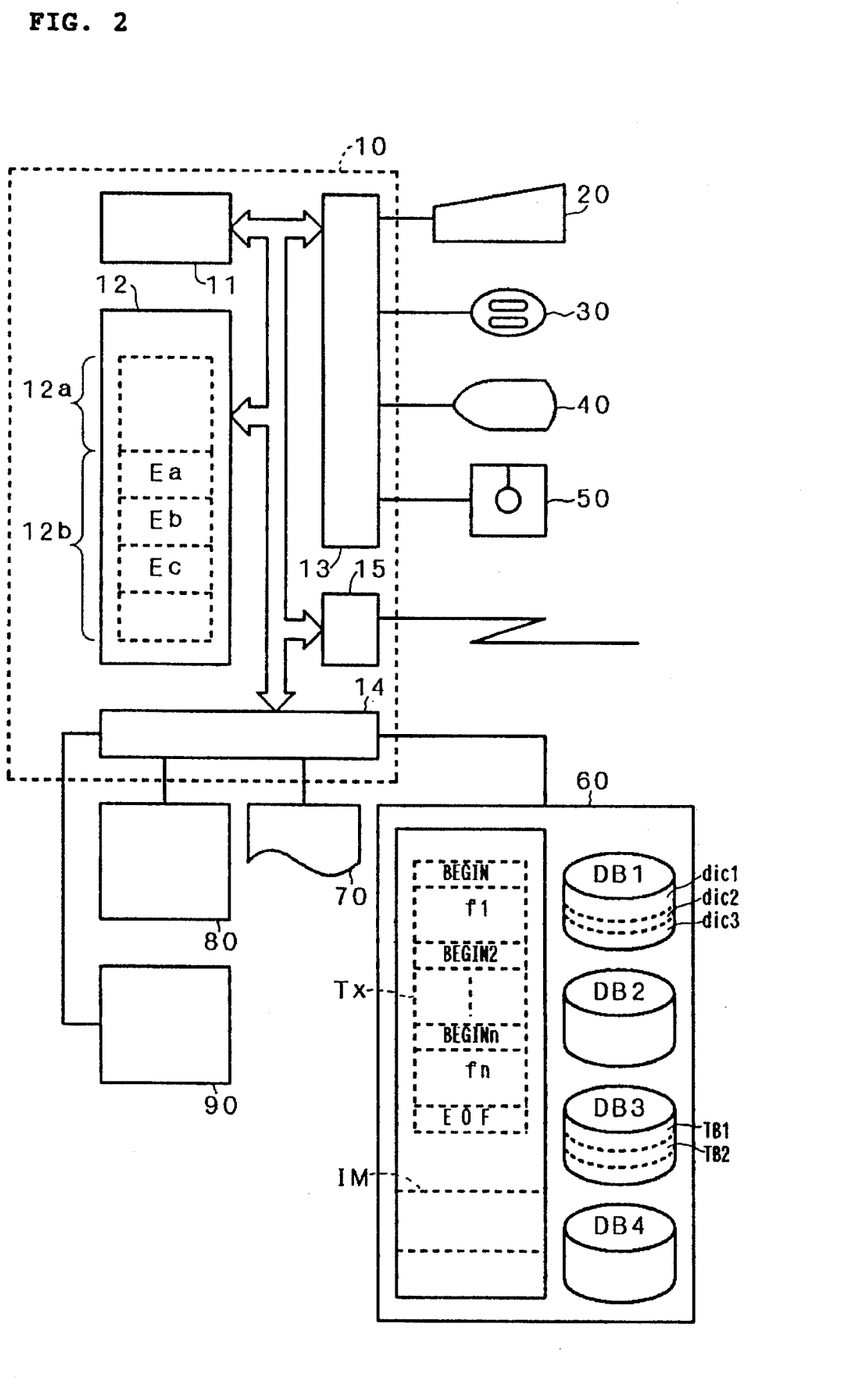
FIG. 2 is a block diagram of the gazette editing system of the embodiment.

The gazette editing system shown in FIG. 2 retrieves a desired gazette from the gazette bulletin recorded on a CD-ROM, and outputs the retrieved gazette as a text file. The gazette editing system includes an information processor 10, keyboard 20, mouse 30, cathode ray tube or CRT display 40, flexible disk unit or FD unit 50, hard disk unit or HD unit 60, printer 70, CD-ROM reading unit or CD unit 80 and optical disk unit 90.

The output file outputted from the gazette editing system is used for translation by an external automatic translation equipment (not-shown).

The present gazette editing system includes the function of performing key word retrieval. Since the function is not a principal part of the present invention, the detailed explanation of the function is omitted for simplification.

The information processor 10 includes a CPU 11 which is a logic calculation circuit, memory 12, internal interface 13, external interface 14, communication interface 15 for data transmission with the external automatic translation equipment. The memory 12 is provided with a program area 12a and work area 12b. The internal interface 13 is connected to the keyboard 20, mouse 30, CRT display 40 and FD unit 50. The external interface 14 is connected to the HD unit 60, printer 70, CD unit 80 and optical disk unit 90.

The information processor 10, when started up, assigns retrieval condition area Ea, index area Eb, option area Ec and other areas to the work area 12b of the memory 12, and outputs a selection menu on the screen of the CRT display 40. Among the selection menu are bibliographical items such as "出願番号 (application number)", "公開番号 (laid open number)", "公開日 (date of laid open)", "IPC分類 (international patent classification)" and "優先権主張番号 (priority number)" and "FT" denoting file index item used in the docket system of the Japanese Patent Office. The selection menu also includes elimination data items for designating code or data to be eliminated. The selection menu further includes an optional function item to perform extractive translation for translating, in advance to the translation by the automatic translation equipment, a given terminology into a target language, such as English, German, French or Spanish. When retrieval items, retrieval condition and optional function are designated from the keyboard 20 or mouse 30, the information processor 10 stores the designated conditions in the retrieval condition area Ea and option area Ec. Subsequently, an application corresponding to the designated retrieval conditions is searched out and the search result is stored in the index area Eb. The storage is effected sequentially in accordance with the application number of the document searched out.

The HD unit 60 stores database of a dictionary DB1, grammar rule dictionary DB2, reference format rule dictionary DB3 and Japanese-English dictionary DB4 for performing analysis on syntax, sentence element and word. The HD unit 60 still has a sufficient remainder area to be text area TX and image area IM for storing text information and image data of the gazette read out at the CD unit 80. The dictionary DB1 has, in addition to a general dictionary dic1, a nomenclature dictionary dic2 and a special dictionary dic3. The nomenclature dictionary dic2 stores vocabularies encompassing the Ministry-approved nomenclatures in each field, industrial terminology and jargon. The special dictionary dic3 stores delimiters which will be later explained in detail. The reference format rule dictionary DB3 stores format rules as table TB1, according to which the fluctuation of expression is corrected. The format rule stored in the reference format rule dictionary DB3 includes lexicon standard specified by the Cabinet Notification, Education Ministry Notification and the Report of the Japanese Language Council, and the terminology standard defined in "Glossary of Terms used in A0002 Construction Module" and "Glossary of Terms used in Z8121 Operations Research" issued by the Japanese Industrial Standard. The reference format rule dictionary DB3 further stores a table TB2 of noun derivative-verbs which inflects in the "sa" line of the Japanese syllabary.

A CD-ROM, issued by the Japanese Patent Office and recording gazettes of laid open Japanese patent applications, is installed within the CD unit 80. In the CD-ROM, there are stored a key index file for storing key words for retrieval and a text file recording technical information such as patent specifications.

The optical disk unit 90 detachably receives a cartridge type of optical magnetic disk therein, and stores files of the retrieved gazettes.

The operation of the information processor 10 will be explained hereinafter. First referring to FIG. 3, the file linking process is for linking a plurality of whole document files or front page files into a single file and begins when the information processor 10 finishes its search for a patent application corresponding to the retrieval conditions.

Figure 3:
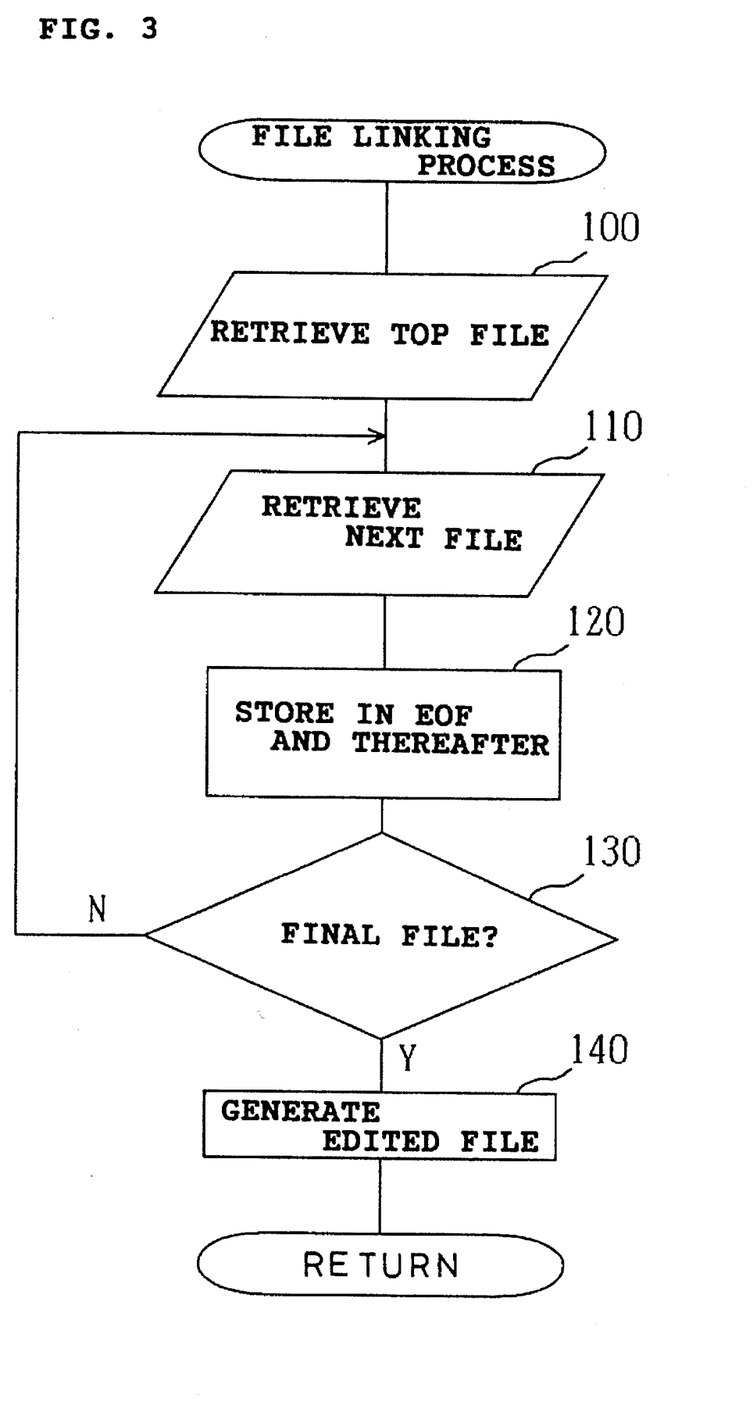
FIG. 3 is a flowchart of the file linking process performed by the information processor.

First, at step 100, a text file f1 corresponding to the application number at the top of the application numbers now stored in the index area Eb is retrieved from the CD unit 80 and stored temporarily in the text area TX of the HD unit 60 from the top address BEGIN. Thus, the control characters EOF, or 1A in the hexadecimal code, indicative of the end of a file is lastly stored in an address, and that address becomes the end of the data in the HD unit 60. When storing the text files, image file and position file included in whole document files, and image data included in front page files are excluded from the storage.

Next, at step 110, text files of the subsequent application numbers are sequentially retrieved, and stored, at step 120, in the address having the codes EOF previously stored and further addresses. Therefore, the data at the end of a text file lastly stored in the address is overwritten, thereby erasing the code EOF or 1A. As a result, the text files are linked each other.

At next step 130, it is determined whether all of the text files have been read out or not. When the determination is "NO", the process step returns to step 110. When the determination is "YES" at the step 130, the data stored in the addresses from the top address BEGIN to the last address having the code EOF are united into a single file having a file name of "edited file," and then the instant process ends.

Figure 5:
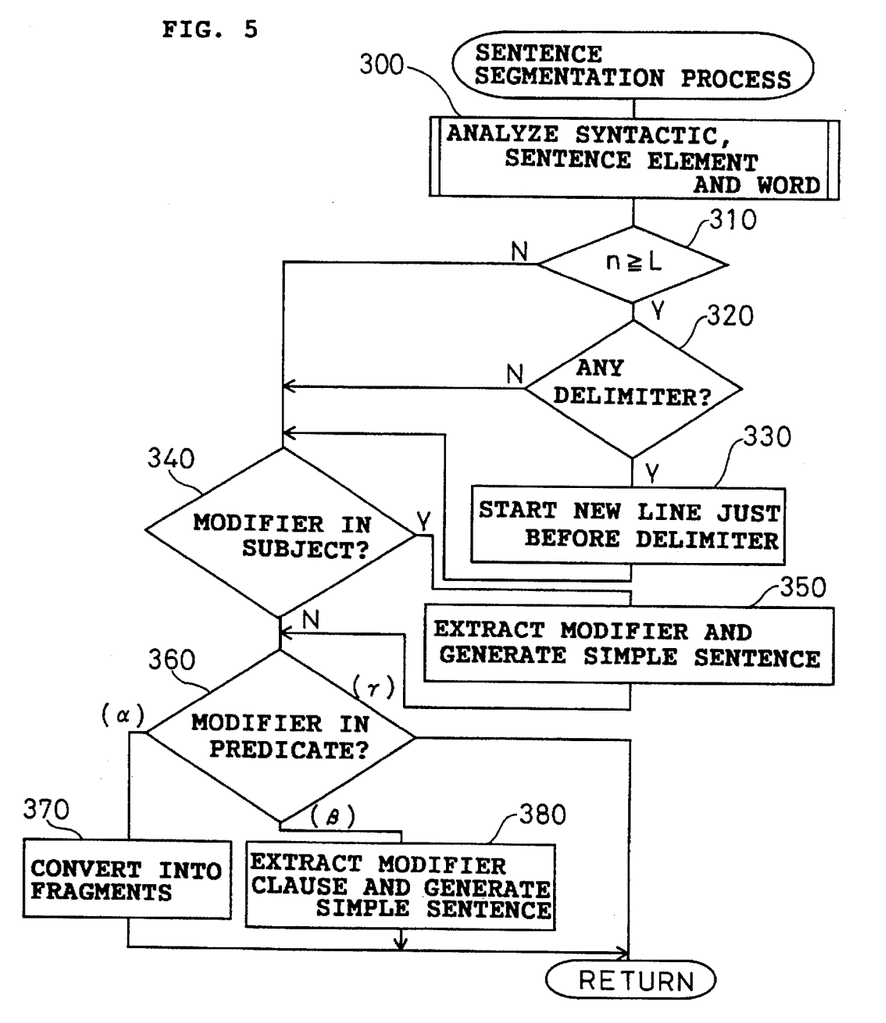
FIG. 5 is a flowchart of the sentence segmentation process performed by the information processor.
Figure 6:
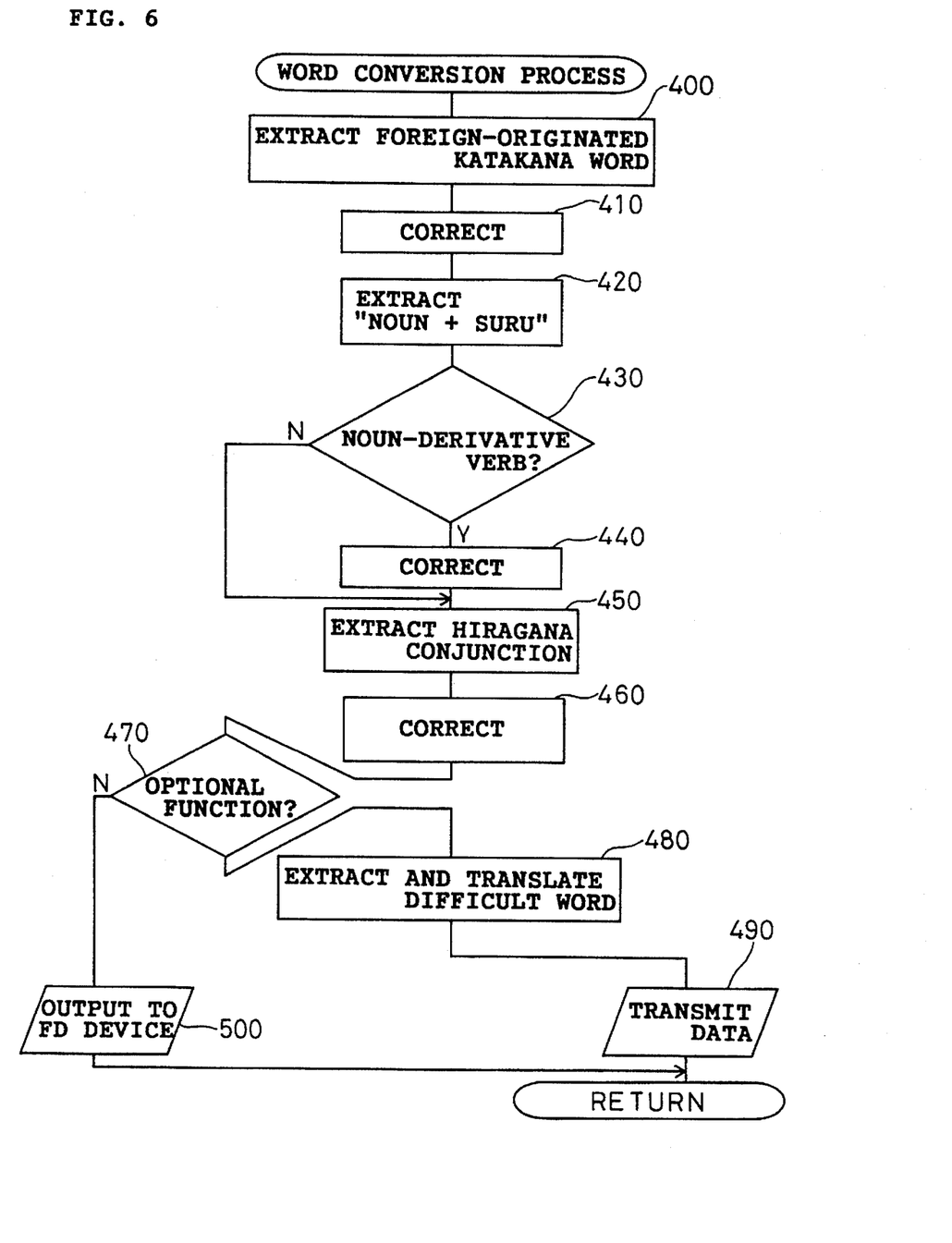
FIG. 6 is a flowchart of the word conversion process performed by the information processor.

Subsequently, the unnecessary data elimination process, the sentence segmentation process and the word conversion process are sequentially effected, in accordance with the flowcharts of FIGS. 4, 5 and 6, for the edited file derived by the above file linking process.

Figure 4:
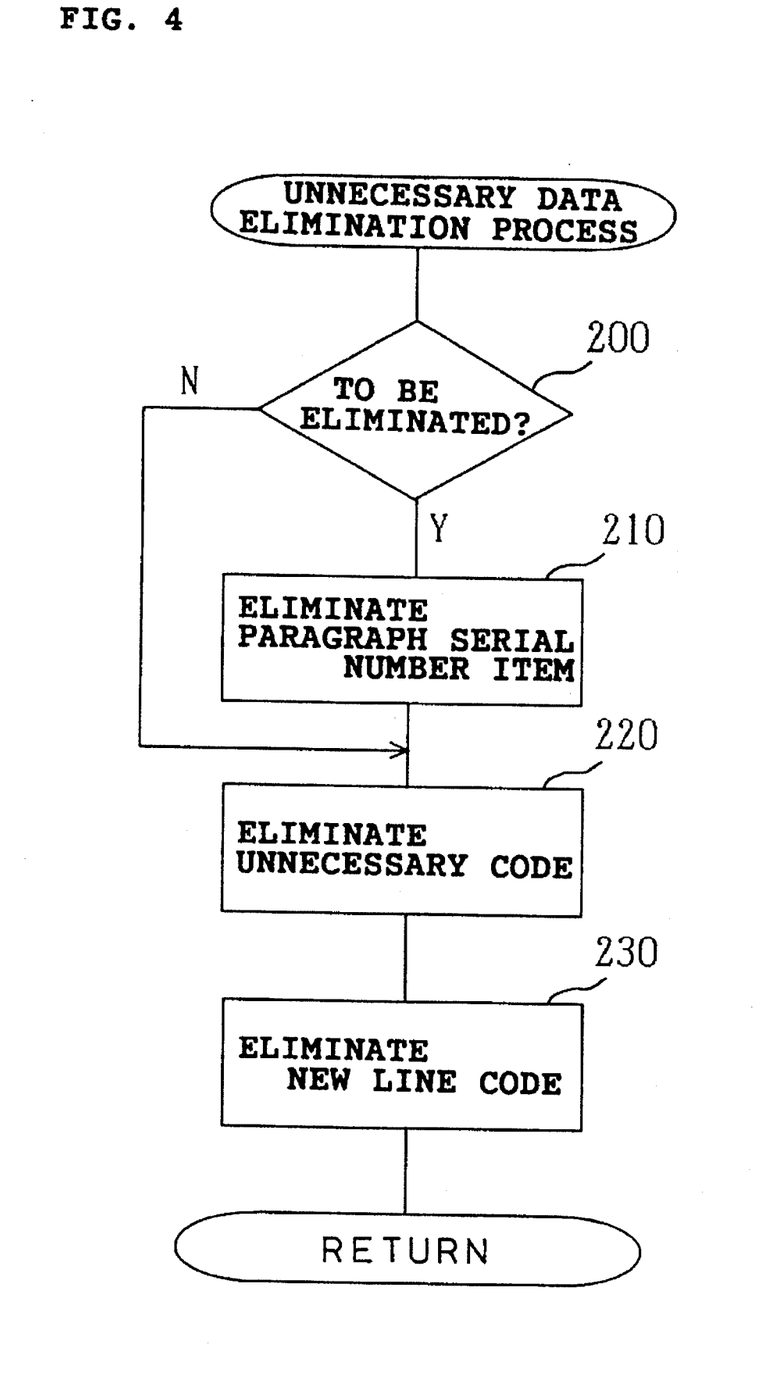
FIG. 4 is a flowchart of the unnecessary information elimination process performed by the information processor.

As shown in FIG. 4, when the unnecessary data elimination process starts, at step 200 it is determined whether or not any text information included in the edited file are designated as the data item to be eliminated. Specifically, determination is made as to whether paragraph serial number item, such as [0001], other than the article heading item such as [発明の名称] (meaning "Title of the Invention"), is included in the eliminated data items stored in the retrieval condition area Ea. When the determination is "YES" at this step, the process step goes to step 210 and the all of the paragraph serial numbers and their accompanying new line codes are eliminated from the edited file. The process step, then, proceeds to step 220. When the determination is "NO" at step 200, the process step skips the step 210 and goes directly to the step 220.

At the step 220, blank pages, the new page control code OCOA, tab code, "=", [# 1] (meaning "frame 1") and [# 10] (meaning "frame 10") are eliminated. At the last step 230 of the instant process, spaces inserted into the end of each line, new line codes ODOA intermediating a sentence are eliminated, thereby refining the sentences of the edited file. The instant process is then followed by the sentence segmentation process shown in FIG. 5.

At the first step 300 of the sentence segmentation process, the syntax, sentence element and word of the edited file are analyzed. Since the analysis is known as the parsing, sentence element analysis and word analysis (or word segmentation), the detailed explanation of the process is omitted herein.

At next step 310, it is determined whether or not the number n of the words included in the one sentence is equal to or greater than a predetermined value L. When the determination is "YES" at this step, it is next determined, at step 320, if the sentence has any delimiter. When the determination is "YES" at this step, the process step proceeds to step 330 to divide the sentence, at immediately before the delimiter, into two sentences the latter of which starts in a new line, and the process step goes to step 340.

On the other hand, when the determination is "NO" at the step 310, the process step goes directly to step 340. Likewise, if "NO" is determined at the step 320, the process step goes directly to step 340.

At the step 340, it is determined whether the subject of the sentence has any modifier clause. When the determination is "YES" at this step, the flow goes to step 350. When the determination is "NO" at the step 340, the flow goes to step 360. The delimiters referred to herein are defined as the words which combine an independent clause with other independent or dependent clause into a single sentence. For example, the delimiters are conjunctions such as "同時に" (meaning "at the same time"), "すなわち" (meaning "that is to say"), "一方" (meaning "on the other hand") and "他方" (meaning "meanwhile"), adverbs such as "さらに" (meaning "furthermore"), "つまり" (meaning "specifically"), "要するに" (meaning "in short"), adverbs such as "続いて" (meaning "subsequently"), "くわえて" (meaning "additionally") and collocations such as "(と)共に" (meaning "simultaneous with" or "concurrent with").

At step 350, the modifier clause is extracted, and a short sentence reading "＜主語＞は＜修飾節＞である" (meaning "the subject is modifier") is generated and inserted immediately before the original sentence. The original sentence is refined, without the modifier clause. For instance, the sentence reading "a でありbでありc である＜主語＞は、 . . . である" (meaning "the subject, which is a, b and c, is such and such") is divided into a sentence reading "＜主語＞はaでありbでありcである。" (meaning "the subject is a, b and c.") and a sentence reading "その＜主語＞は . . . である。" (meaning "the subject is such and such.")

Following the negative determination at the step 340 or the process at step 350, it is next determined, at step 360, whether the predicate of the sentence accompanies (a) serial modifiers, (b) a single modifier or (c) no modifier. When it is determined at this step that (a) the predicate accompanies serial modifiers, the flow proceeds to step 370. When it is determined at the step 360 that (b) the predicate accompanies a single modifier, the flow goes to step 380. When it is determined at the step 360 that (c) the predicate accompanies no modifier, the instant process ends.

At the step 370, the predicate is divided into fragments. As a result, a long sentence having the predicate accompanying serial modifiers, such as the sentence reading "＜主語＞は、A, B, C, . . . Zである" (meaning "the subject is A, B, C, - - - Z.") are transformed into a single short sentence reading "＜主語＞は次の態様をなしている。" (meaning "the subject is as follows") and fragmented modifier clauses reading "A (new line). B (new line). C (new line). - - - . Z (new line). The elements A through Z may be phrases or clauses. When the element is a clause, the clause will be regarded as a simple sentence when translated.

At the step 380, the modifier clause is extracted, and a single short sentence reading "＜主語＞は＜修飾節＞である" (meaning "the subject is modifier") is generated and inserted immediately before the original sentence. The original sentence is refined without the modifier clause, and the instant process ends and is followed by the word conversion process shown in FIG. 6.

At first step 400 of the word conversion process, words originated from foreign language and in katakana notation are extracted. The extracted words are then corrected in accordance with the correct writing rule. For instance, the long vowel mark - at the end of a word is remained when it is a two-or-less syllable words such as "バー" (meaning "bar") and "リレー" (meaning "relay"), while the long vowel mark is omitted if the word is three-or-more syllable word such as "メモリ" (meaning "memory") and "アナライザ" (meaning "analyzer").

At next step 420, word constructed by a noun and a verb "する" (meaning "do") is extracted. It is next determined, at step 430, whether the extracted word is a noun derivative-verb which inflects in the "sa" line of the Japanese syllabary, according to the noun derivative-verb table TB2 of the reference format rule dictionary DB3. When the determination is "YES" at this step 430, the flow skips step 440 and goes to step 450. When the determination is "NO" at the step 430, the flow goes to step 450. At the step 440, the extracted word is corrected to a reference format, such as "名詞+を+する" ("noun"+wo+"suru"), according to the noun derivative-verb table TB2. As a result of the correction, word "特許する" is corrected to "特許権を与える" (or 特許を受けるべきものと裁定する), word "機能する" is corrected to "働きをする(作用する)", and "科学する" is corrected to "科学的にものをみる", for example.

At step 450, conjunctions or adverbs noted in hiragana characters, such as "かつ", "また", "または", "なお", "ただし" and "すなわち", are extracted. Subsequently, the extracted hiragana words are corrected, at step 460, to words noted in both kanji characters and hiragana characters, such as "且つ", "又", "又は", "尚", "但し" and "即ち". This correction is for facilitating the later translation, since it is relatively easier to perform the sentence element analysis on phrases having kanji and hiragana characters intermingled than on phrases having only hiragana characters, although the reference format of these extracted words is notation in hiragana.

Subsequently, at step 470, it is determined whether an instruction to perform optional function has been entered to perform extractive translation for translating, in advance to the translation by the automatic translation equipment, a given terminology into a target language. When the determination is "YES" at the step 470, the flow proceeds to step 480.

At step 480, proper nouns, nouns and set phrases which are difficult to translate are extracted according to the Japanese-English dictionary DB4, and translated. The examples are shown below.

| Japanese | English |
| --- | --- |
| (19) 発行国 日本国特許庁 (J P) | [19] Japanese Patent Office (JP) |
| (12) 公報種別 公開特許公報 (A) | [12] Patent Laid Open Gazette |
| (11) 公開番号 | [11] Japanese Patent Laid Open Number |
| (43) 公開日 | [43] Date of Laid Open |
| (54) 発明の名称 | [54] Title of the Invention |
| (51) 国際特許分類第5版 | [51] Int.CL.5. |
| (21) 出願番号 | [21] Application Number |
| (22) 出願日 | [22] Filed: |
| (31) 優先権主張番号 | [31] Priority Number |
| (32) 優先日 | [32] Priority Date |
| (33) 優先権主張国 | [33] Priority Country |
| (71) 出願人 | [71] Applicant |
| 識別番号 | [Identification Number] |
| (57) 要約 | [57] Abstract |
| 効果 | [Advantages] |
| 目的 | [Object] |
| 構成 | [Construction] |
| 審査請求 未請求 | [Request for Examination] haven't been requested yet |
| 請求項の数 | [Number of Claims] |
| 全頁数 | [Total Page Number of This Gazette] |

The flow, then, proceeds to step 490 where the edited file is transmitted, as "pre-edited file", to an external automatic translation equipment (not-shown), thereby ending the instant process.

On the other hand, when the determination is "NO" at the step 470, the flow goes to step 500. At the step 500, the edited file is output to the FD unit 50 and the optical disk unit 90 or printer 70, and the instant process ends.

As a result of the above described process, the expressions having fluctuation is corrected and the fluctuation is eliminated.

As described above, in the embodiment a plurality of text files is linked into a single file, which is then deprived of its unnecessary data other than text information and refined. Then, compound sentences and complex sentences included in the refined single file are divided into simple sentences. Further, fluctuation of expression is absorbed and eliminated, and editing of text files input from CD unit 80 is automatically performed. The present invention attains linking process and refinement of text files without manual labor.

Moreover, the sentences in the edited file are free from the fluctuation of expression and alienation from the reference format rule. Since the long sentences in the original file are converted into simple sentences, it is enabled to pre-edit the document fully automatically, and the problem of mistranslation and translationinability is reduced. Further, since the words which are difficult to be translated into the Japanese are translated, in advance, into equivalent words in the target language, the translation process using the automatic translation equipment is expedited and enabled to handle a much larger volume of translation.

Furthermore, complex sentences in the difficult patent specifications are refined into simple sentences, and serial modifiers are converted into fragments. Therefore, the present invention facilitates search for technical information in the patent specifications.

This invention has been described above with reference to the preferred embodiment as shown in the drawings. Modifications and alterations may become apparent to one who skilled in the art upon reading and understanding the specification. Despite the use of the embodiment for illustration purposes, it is intended to include all such modifications and alterations within the scope and spirit of the appended claims.

In this spirit, it should also be noted that in the embodiment, stored in the special dictionary dic3 of the dictionary DB1 are delimiters. Such delimiters may include any words which suspend a part of the document as a suspended construction independent from other parts. In this case, in addition to the delimiters defining the suspended construction, attributes data which specifies the manner of sentence segmentation and document partition position may be stored in the dictionary.

For example, the dictionary may store a delimiter "例えば" (meaning "for instance") along with its attribute of sentence segmentation for generating an independent sentence from the suspended construction. The information processor 10 may be programmed such that the sentence segmentation and the following sentence refinement process are performed on the sentence if it has any delimiter having such an attribute. Specifically, in the first step, the word "例えば" (meaning "for instance") and its accompanying serial elements are extracted. In the next step, the original sentence, without the extracted parts, is refined. In the last step, an independent sentence reading "<「主器」+「の例としてはシリーズ要素1、シリーズ要素2、シリーズ要素3、．．．．がある。」>" (meaning "the examples of the subject are serial element 1, serial element 2, serial element 3 - - - .") is generated from the extracted word and serial elements. Referring to the following example, the original sentence reading "温度を検出する手段、例えば、熱電対、白金測温抵抗体、IC化温度測定装置は、A/D変換用のインターフェース回路を必要とする。" (meaning "Means for sensing temperature such as thermocouple, resistance temperature sensor and IC temperature sensor, requires interface circuit for A/D converter.") is divided into two sentence of:

*「温度を検出する手段は、A/D変換用のインターフェース回路を必要とする。」 (meaning "Means for sensing temperature requires interface circuit for A/D converter"), and 「温度を検出する手段の例としては、熱電対、白金測温抵抗体、IC化温度測定装置がある。」 (meaning "The examples of the means for sensing temperature are thermocouple, resistance temperature sensor and IC temperature sensor").

Wherefore, having described the present invention, what is claimed is:

1. A CD-ROM information editing apparatus for editing information input from an external information reading equipment which reads out information from CD-ROM storage medium, said CD-ROM information editing apparatus comprising:

first storing means for storing a plurality of text files input from said external CD-ROM information reading equipment;

second storing means for storing word data concerning delimiters in said original language;

third storing means for storing sentence revision rule;

fourth storing means for storing reference format rule of word data in said language in which said text is written;

file linking means for linking said plurality of text files stored in said first storing means into a single text file;

extracting means for extracting predetermined delimiters from said single text file according to said word data stored in said second storing means;

first editing means for editing said single text file by eliminating unnecessary information other than text information from said single text file and by segmenting sentence data at said delimiters extracted by said extracting means, according to said sentence revision rule stored in said third storing means;

detection means for detecting an alienation of said word data included within said single text file from said reference format stored in said fourth storing means;

second editing means for editing said single text file by correcting said alienation of said word data detected by said detection means according to said reference format rule stored in said fourth storing means; and output means for outputting said single text file edited by said first and second editing means;

wherein said first editing means extracts any modifier clause included in the subject of a sentence and divides the sentence into a sentence reading subject as a modifier and a sentence reading subject as a predicate.

2. A CD-ROM information editing apparatus for editing information input from an external information reading equipment which reads out information from CD-ROM storage medium, said CD-ROM information editing apparatus comprising:

first storing means for storing a plurality of text files input from said external CD-ROM information reading equipment;

second storing means for storing word data concerning delimiters in said original language;

third storing means for storing sentence revision rule;

fourth storing means for storing reference format rule of word data in said language in which said text is written;

file linking means for linking said plurality of text files stored in said first storing means into a single text file;

extracting means for extracting predetermined delimiters from said single text file according to said word data stored in said second storing means;

first editing means for editing said single text file by eliminating unnecessary information other than text information from said single text file and by segmenting sentence data at said delimiters extracted by said extracting means, according to said sentence revision rule stored in said third storing means;

detection means for detecting an alienation of said word data included within said single text file from said reference format stored in said fourth storing means;

second editing means for editing said single text file by correcting said alienation of said word data detected by said detection means according to said reference format rule stored in said fourth storing means; and output means for outputting said single text file edited by said first and second editing means;

wherein said first editing means divides a predicate into fragments if the predicate has a serial modifier clauses.

3. A CD-ROM information editing apparatus for editing information input from an external information reading equipment which reads out information from CD-ROM storage medium, said CD-ROM information editing apparatus comprising:

first storing means for storing a plurality of text files input from said external CD-ROM information reading equipment;

second storing means for storing word data concerning delimiters in said original language;

third storing means for storing sentence revision rule;

fourth storing means for storing reference format rule of word data in said language in which said text is written;

file linking means for linking said plurality of text files stored in said first storing means into a single text file;

extracting means for extracting predetermined delimiters from said single text file according to said word data stored in said second storing means;

first editing means for editing said single text file by eliminating unnecessary information other than text information from said single text file and by segmenting sentence data at said delimiters extracted by said extracting means, according to said sentence revision rule stored in said third storing means;

detection means for detecting an alienation of said word data included within said single text file from said reference format stored in said fourth storing means;

second editing means for editing said single text file by correcting said alienation of said word data detected by said detection means according to said reference format rule stored in said fourth storing means; and output means for outputting said single text file edited by said first and second editing means;

wherein said first editing means generates, if the predicate of a sentence has a single modifier clause, a sentence reading the subject is predicate, inserts the generated sentence immediately before the original sentence, and deletes the modifier clause of the original sentence.

4. A CD-ROM information editing apparatus for editing information input from an external information reading equipment which reads out information from CD-ROM storage medium, said CD-ROM information editing apparatus comprising:

first storing means for storing a plurality of text files input from said external CD-ROM information reading equipment;

second storing means for storing word data concerning delimiters in said original language;

third storing means for storing sentence revision rule;

fourth storing means for storing reference format rule of word data in said language in which said text is written;

file linking means for linking said plurality of text files stored in said first storing means into a single text file;

extracting means for extracting predetermined delimiters from said single text file according to said word data stored in said second storing means;

first editing means for editing said single text file by eliminating unnecessary information other than text information from said single text file and by segmenting sentence data at said delimiters extracted by said extracting means, according to said sentence revision rule stored in said third storing means;

detection means for detecting an alienation of said word data included within said single text file from said reference format stored in said fourth storing means;

second editing means for editing said single text file by correcting said alienation of said word data detected by said detection means according to said reference format rule stored in said fourth storing means; and output means for outputting said single text file edited by said first and second editing means;

wherein said second editing means corrects foreign-originated Japanese word according to said reference format rule.

5. A CD-ROM information editing apparatus for editing information input from an external information reading equipment which reads out information from CD-ROM storage medium, said CD-ROM information editing apparatus comprising:

first storing means for storing a plurality of text files input from said external CD-ROM information reading equipment;

second storing means for storing word data concerning delimiters in said original language;

third storing means for storing sentence revision rule;

fourth storing means for storing reference format rule of word data in said language in which said text is written;

file linking means for linking said plurality of text files stored in said first storing means into a single text file;

extracting means for extracting predetermined delimiters from said single text file according to said word data stored in said second storing means;

first editing means for editing said single text file by eliminating unnecessary information other than text information from said single text file and by segmenting sentence data at said delimiters extracted by said extracting means, according to said sentence revision rule stored in said third storing means;

detection means for detecting an alienation of said word data included within said single text file from said reference format stored in said fourth storing means;

second editing means for editing said single text file by correcting said alienation of said word data detected by said detection means according to said reference format rule stored in said fourth storing means; and output means for outputting said single text file edited by said first and second editing means;

wherein said second editing means corrects word constructed by noun and "suru" according to said reference format rule.

6. A CD-ROM information editing apparatus for editing information input from an external information reading equipment which reads out information from CD-ROM storage medium, said CD-ROM information editing apparatus comprising:

first storing means for storing a plurality of text files input from said external CD-ROM information reading equipment;

second storing means for storing word data concerning delimiters in said original language;

third storing means for storing sentence revision rule;

fourth storing means for storing reference format rule of word data in said language in which said text is written;

file linking means for linking said plurality of text files stored in said first storing means into a single text file;

extracting means for extracting predetermined delimiters from said single text file according to said word data stored in said second storing means;

first editing means for editing said single text file by eliminating unnecessary information other than text information from said single text file and by segmenting sentence data at said delimiters extracted by said extracting means, according to said sentence revision rule stored in said third storing means;

detection means for detecting an alienation of said word data included within said single text file from said reference format stored in said fourth storing means;

second editing means for editing said single text file by correcting said alienation of said word data detected by said detection means according to said reference format rule stored in said fourth storing means; and output means for outputting said single text file edited by said first and second editing means;

wherein said second editing means extracts words which are difficult to be translated and translates the extracted words into predetermined terms in the target language.

* * * * *